United States Patent
Pauletti et al.

(10) Patent No.: US 7,242,227 B2
(45) Date of Patent: Jul. 10, 2007

(54) COMMON MODE STABILIZATION CIRCUIT FOR DIFFERENTIAL BUS NETWORKS

(75) Inventors: Timothy P. Pauletti, Plano, TX (US); John H. Carpenter, Jr., Rowlett, TX (US); Wayne Tien-Feng Chen, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/979,696

(22) Filed: Nov. 1, 2004

(65) Prior Publication Data

US 2006/0091915 A1    May 4, 2006

(51) Int. Cl.
*H03K 3/00* (2006.01)
(52) U.S. Cl. ................. 327/112; 327/379; 327/170
(58) Field of Classification Search ............. 327/112, 327/379, 170
See application file for complete search history.

(56) References Cited

U.S. PATENT DOCUMENTS

| | | | |
|---|---|---|---|
| 5,448,180 A * | 9/1995 | Kienzler et al. | 326/86 |
| 6,324,044 B1 * | 11/2001 | Teggatz et al. | 327/379 |
| 6,366,130 B1 * | 4/2002 | Podlesny et al. | 326/86 |
| 6,922,073 B2 * | 7/2005 | Haase et al. | 326/27 |

\* cited by examiner

*Primary Examiner*—Kenneth B. Wells
*Assistant Examiner*—Ryan C. Jager
(74) *Attorney, Agent, or Firm*—William B Kempler; W. James Brady, III; Frederick J. Telecky, Jr.

(57) ABSTRACT

A differential bus network, in general, or a controller area network (CAN) driver, in particular, controls and minimizes the variation on the common-mode signal of the CAN bus. This CAN driver also provides improved symmetry between its differential output signals, CANH and CANL, and provides protection for its low voltage devices from voltage transients occurring on its output lines. The common-mode signal is sensed and buffered, then during the dominant to recessive transition, the bus signals are shorted to the buffered common mode voltage. Specifically, additional switches or transistors are used to pull the differential output signals, CANH and CANL, to the common mode signal $V_{CM}$ when the state of the CAN bus transitions from dominant to recessive. This improvement minimizes high frequency spikes in the common-mode signal and eliminates DC shifts during transitions of the state of the CAN bus. A driver system may include a plurality of CAN drivers are serially interconnected to form a driver system, wherein each downstream driver stage receives a time-delayed form of the digital input signal TxD, each stage providing a time-delayed contribution to the differential output signals of the overall driver system.

19 Claims, 4 Drawing Sheets

COMMON MODE STABILIZATION CIRCUIT FOR DIFFERENTIAL BUS NETWORKS

FIELD OF THE INVENTION

The present invention relates to differential bus networks and, more particularly, to an output driver for use in any differential bus network transceiver for employing low voltage components for high speed performance configured to handle high voltage transients.

BACKGROUND OF THE INVENTION

Differential bus networks include one or more data buses connecting subcircuits of a system as a means of providing signal transmission to internal and external subcircuits incorporated within the system. Differential bus networks are typically used in electronic communication systems, such as, automotive multiplex wiring and computer interfaces. In particular, differential bus networks may include differential bus drivers applicable to voltage mode interface standards, such as RS422, Controller Area Network (CAN), Automotive Multiplex Wiring System (Abus) and Vehicle Area Network (VAN).

CAN systems are currently implemented as common networking systems for automotive and industrial applications. In particular, CAN systems provide a lightweight and cost effective means for the vehicle's central processing unit to communicate with satellite peripheral modules, e.g., dome lamps, door modules, headlight modules, taillight modules, anti-skid braking system (ABS) modules, airbag modules, etc. A typical arrangement includes a CAN wire having a one or two wire links routed throughout the entire vehicle. The CAN wire link is a twisted pair of two wires, CANH and CANL, which represent the high and low signals applied to the twisted pair, respectively.

In operation, a differential signal is applied to the CAN wire. This signal is transmitted and received on the opposite end of the CAN wire. When the two signals representing a high voltage and a low voltage, CANH and CANL, respectively, are the same voltage, the CAN wire is in a recessive state, wherein the recessive state indicates that no differential voltage exists across CAN nodes, CANH and CANL. When the two signals, CANH and CANL, have some differential in voltage, typically 2 volts, the CAN wire is in a dominant state, wherein the dominant states indicates that a differential voltage greater than 0.9 v differential exists.

The International Standards Organization (ISO) specifies that the CAN wire be at least ten meters in length. Unfortunately, at this length, the CAN wire acts as an ideal antenna which is subject to automotive-type high voltage transients, as well as industrial-type transients, such as radiated emissions, electromagnetic interference (EMI) and electrostatic discharge (ESD).

In general, radiated emissions interfere with various types of electronic equipment, such as cell phones and radios or any other electronic device. Although most electronics have radiated emissions to some degree, radiated emissions is of substantial concern in automotive systems, due to the variable amount of electronics in automobiles. Specifically, within a CAN system, radiated emissions are high frequency signals that are emitted from the CAN wire.

In order to operate in the harsh environments of automotive and industrial settings, a CAN transceiver must successfully withstand these high voltage transients and must be capable of handling the standard automotive requirements of double battery and a 40 volt load dump. It must also withstand shorts from the CAN wire to $V_{cc}$, ground, and any other power supply associated with the system. These requirements are typically specified as the ability to survive voltages on the CAN wire(s) between +40 and −27 volts.

Furthermore, besides the ISO length requirement being the primary cause of radiated emissions, radiated emissions occur when there is no symmetry between the CAN signals, CANH and CANL. If the CAN signals, CANH and CANL, are skewed in anyway from one another, a voltage differential for the CAN signal is created which results in radiated emissions. When the CAN signals, CANH and CANL, are perfectly symmetric, however, a minimal amount of radiated emissions exists.

In order to obtain high speed and symmetry, it is desirable to use low voltage, matched components. However, in this configuration, these low voltage components cannot withstand high voltage conditions due to gate oxide integrity issues and drain-to-source breakdown voltage limitations. High voltage components are not desirable for CAN applications due to their larger gate capacitances, and hence their slower operation. These high voltage components also incur a considerable silicon area penalty.

Figure 1:
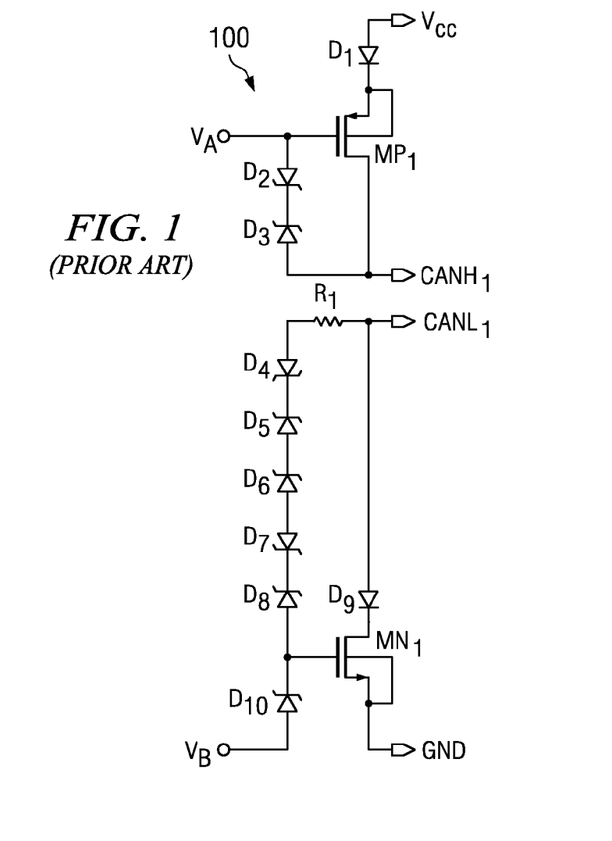
FIG. 1 is a known diagram of output driver of a controller area network (CAN) transceiver.

A known controller area network (CAN) transceiver includes an output driver as is shown in FIG. 1. Output driver 100 includes a CANH driver and a CANL driver. The CANH driver uses a pnp (or a PMOS) transistor $MP_1$ as an active device, while the CANL driver uses an npn (or an NMOS) transistor $MN_1$ as an active device. Voltages applied at nodes, $V_A$ and $V_B$, turn those two transistors, $MP_1$ and $MN_1$, on and off, respectively. Thereby, the function of each driver is simply to turn transistors, $MP_1$ and $MN_1$, on and off. Typically, the external load that exists between the nodes $CANH_1$ and $CANL_1$ external to the chip is a 60 ohm termination. When transistors, $MP_1$ and $MN_1$, turned on, current flows through the 60 ohm termination load to ground. Thereby, a voltage is set up across nodes $CANH_1$ and $CANL_1$. Accordingly, the recessive and differential state is established. When transistors, $MP_1$ and $MN_1$, are turned off, there will be no differential between nodes $CANH_1$ and $CANL_1$. Once transistors, $MP_1$ and $MN_1$, turn off, no active control exits for the value of the voltage at nodes, $CANH_1$ and $CANL_1$. Thereby, nodes, $CANH_1$ and $CANL_1$, may settle to a value determined passively and in a time dictated by the time constant of the bus capacitance and internal resistance.

Figure 3:
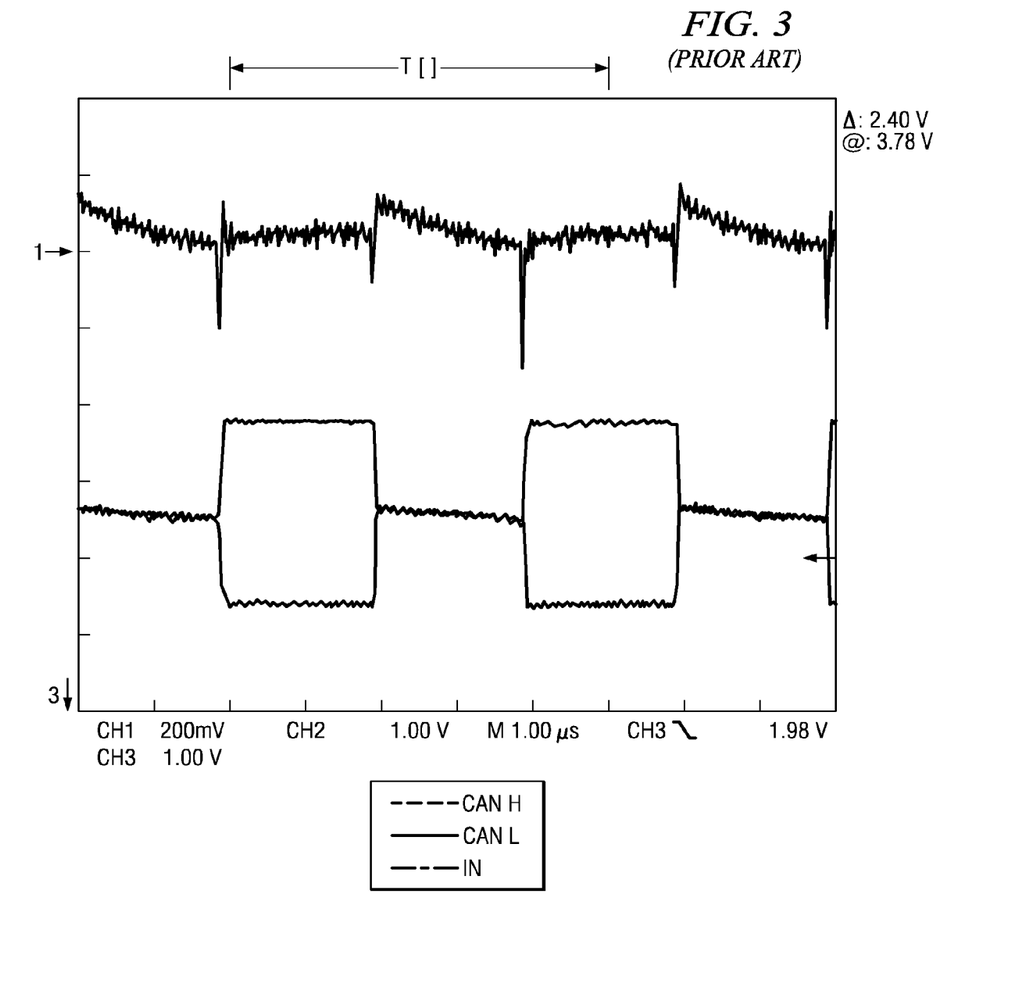
FIG. 3 illustrates a pair of waveforms demonstrating the actual performance of the driver of FIG. 1.
Figure 4:
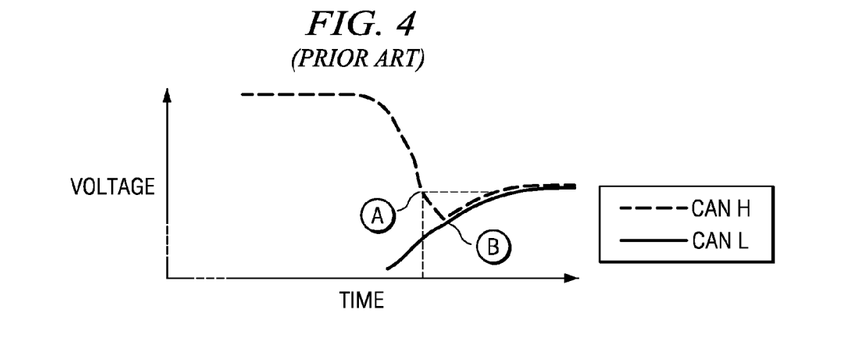
FIG. 4 illustrates a pair of waveforms demonstrating a close view of the transition from the dominant to recessive state of the driver of FIG. 1.

Moreover, radiated emissions may stem from non-idealities that exist when the CAN wires transition from the dominant state to the recessive state. Specifically, with reference to FIG. 2, the waveforms illustrate the voltage of the CAN wires ideally alternating from the recessive state to the dominant state and back to the recessive state. As shown, during the dominant state there is a differential in voltage between nodes, $CANH_1$ and $CANL_1$. During the recessive state, however, there is no differential between nodes, $CANH_1$ and $CANL_1$. FIG. 3 is an actual result of waveforms that display the voltage of the CAN wires ideally alternating from the recessive state to the dominant state and back to the recessive state. FIG. 4 displays a magnified version of the transition from the dominant state to the recessive state. As shown, there is some non-ideality at point B. This non-ideality is the third cause of radiated emissions in a CAN transceiver. The desired response is that both bus signals, $CANH_1$ and $CANL_1$, shift to a common-mode value at point A and remain at this common-mode value. During this transition, however, the PMOS transistor $MP_1$ and the NMOS transistor $MN_2$ in the output driver 100 are turning off. Once these transistors, $MP_1$ and $MN_2$, are off, there is presently no known method of regulating the voltage at these bus nodes, $CANH_1$ and $CANL_1$. Accordingly, these bus nodes, $CANH_1$ and $CANL_1$, transition to a voltage based upon existing conditions.

Thus, there exists a need for a differential CAN driver that includes circuitry that eliminates the non-ideality of the CAN wires during the transition from the dominant state to the recessive state. Furthermore, there exists a need for a CAN transceiver that is protected from high voltage transients. In addition, there exists a need for a CAN transceiver that can withstand shorts from the CAN wire to any power supply rail or ground.

The present invention is directed to overcoming, or at least reducing the effects of one or more of the problems set forth above.

SUMMARY OF THE INVENTION

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present some concepts of the invention in a simplified form as a prelude to the more detailed description that is presented later.

To address the above-discussed deficiencies of differential bus networks, the present invention teaches a differential bus network, in general, or a controlled area network (CAN) driver, in particular, controls and minimizes the variation on the common-mode signal of the CAN bus. This CAN driver also provides improved symmetry between its differential output signals, CAN-H and CAN-L, and provides protection for its low voltage devices from voltage transients occurring on its output lines. A common-mode signal is selected or sensed and buffered, then during the dominant to recessive transition, the bus signals are shorted to the buffered common mode voltage. Specifically, additional switches or transistors are used to pull the differential output signals, CANH and CANL, to the common mode signal $V_{CM}$ when the state of the CAN bus transitions from dominant to recessive. This improvement minimizes high frequency spikes in the common-mode signal and eliminates DC shifts during transitions of the state of the CAN bus.

Further in accordance with the present invention, a driver system may include plurality of CAN drivers are serially interconnected to form a driver system, wherein each downstream driver stage receives a time-delayed form of the digital input signal, each stage providing a time-delayed contribution to the differential output signals of the overall driver system.

The advantages include but are not limited to a differential bus network output driver that minimizes common-mode disturbance during bus transitions, but also a differential bus network that provides improved symmetry between its differential output signals and provides protection for its low voltage devices from voltage transients occurring on its output lines.

The following description and annexed drawings set forth in detail certain illustrative aspects and implementations of the invention. These are indicative of but a few of the various ways in which the principles of the invention may be employed.

BRIEF DESCRIPTION OF THE DRAWINGS

For a more complete understanding of the present invention and the advantages thereof, reference is now made to the following description taken in conjunction with the accompanying drawings in which like reference numbers indicate like features and wherein.

DETAILED DESCRIPTION OF PREFERRED EMBODIMENTS

One or more exemplary implementations of the present invention will now be described with reference to the attached drawings, wherein like reference numerals are used to refer to like elements throughout. The various aspects of the invention are illustrated below in a differential bus network, although the invention and the appended claims are not limited to the illustrated examples.

The present invention is best understood by comparison with the prior art. Hence, this detailed description begins with a discussion of known output driver of a differential bus network shown in FIG. 1.

A known output driver of a CAN transceiver is shown in FIG. 1. A signal to be transmitted, $T_{xD}$, (not shown) is applied to wave shaping circuitry (not shown), wherein voltage references, $V_A$ and $V_B$, are a derivative of this transmitted signal, $T_{xD}$. The voltage references, $V_A$ and $V_B$, are applied to the gate of transistors, $MP_1$ and $MN_1$, respectively. Diodes, $D_2$ and $D_3$, are coupled in series between the drain and gate of transistor $MP_1$. Resistor $R_1$ and diodes, $D_4$, $D_5$, $D_6$, $D_7$, $D_8$, couple in series between the gate of transistor $MN_1$ and the low-side controller area network output terminal $CAN-L_1$. The low-going CAN wire signal $CAN-L_1$ is coupled through diode $D_9$ to the drain of transistor $MN_1$. The backgate of transistor $MN_1$ coupled to the source of transistor $MN_1$, which couples to ground or the second power supply rail.

In the device of FIG. 1, diodes, $D_2$ and $D_3$, prevents parasitics from clamping the wire $CAN-H_1$ at the voltage of the local Vcc. Resistor $R_1$ and diodes, $D_4$, $D_5$, $D_6$, $D_7$, $D_8$, and $D_9$, prohibit any parasitic impedances in transistor $MN_1$ from clamping the $CAN-L_1$ wire at the local ground potential. It is well known that p-channel transistors cannot be matched to n-channel transistors. Therefore, transistors, $MP_1$ and $MN_1$, being of different conduction types, have different strengths and dynamic characteristics, making it difficult to switch these in a symmetrical manner.

Figure 2:
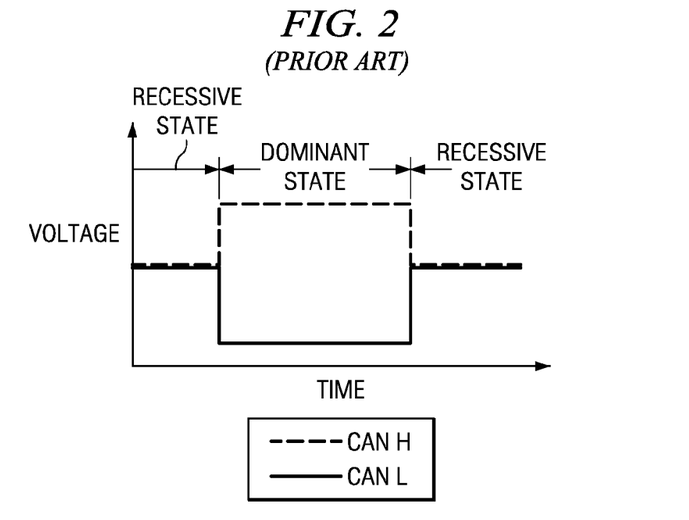
FIG. 2 illustrates a pair of waveforms demonstrating the ideal performance of the driver of FIG. 1.

Referring to FIG. 2, there is shown a pair of waveforms which represents wire, $CAN-H_1$ and $CAN-L_1$, demonstrating the ideal performance of the driver of FIG. 1. The actual performance of the driver of FIG. 1 is shown in FIG. 3. It is easily seen that there is significant overshoot and a marked lack of symmetry between the CAN-$H_1$ and CAN-$L_1$ wires when the driver is switched from its dominant state to its recessive state, and a lack of symmetry and very long settling time when the driver is returned to its recessive state. Even with improvements to the output driver, there still remains some non-ideality as is displayed in FIG. 4, wherein a magnified view of the non-ideality that exists in the pair of waveforms, CAN-$H_1$ and CAN-$L_1$.

Figure 5:
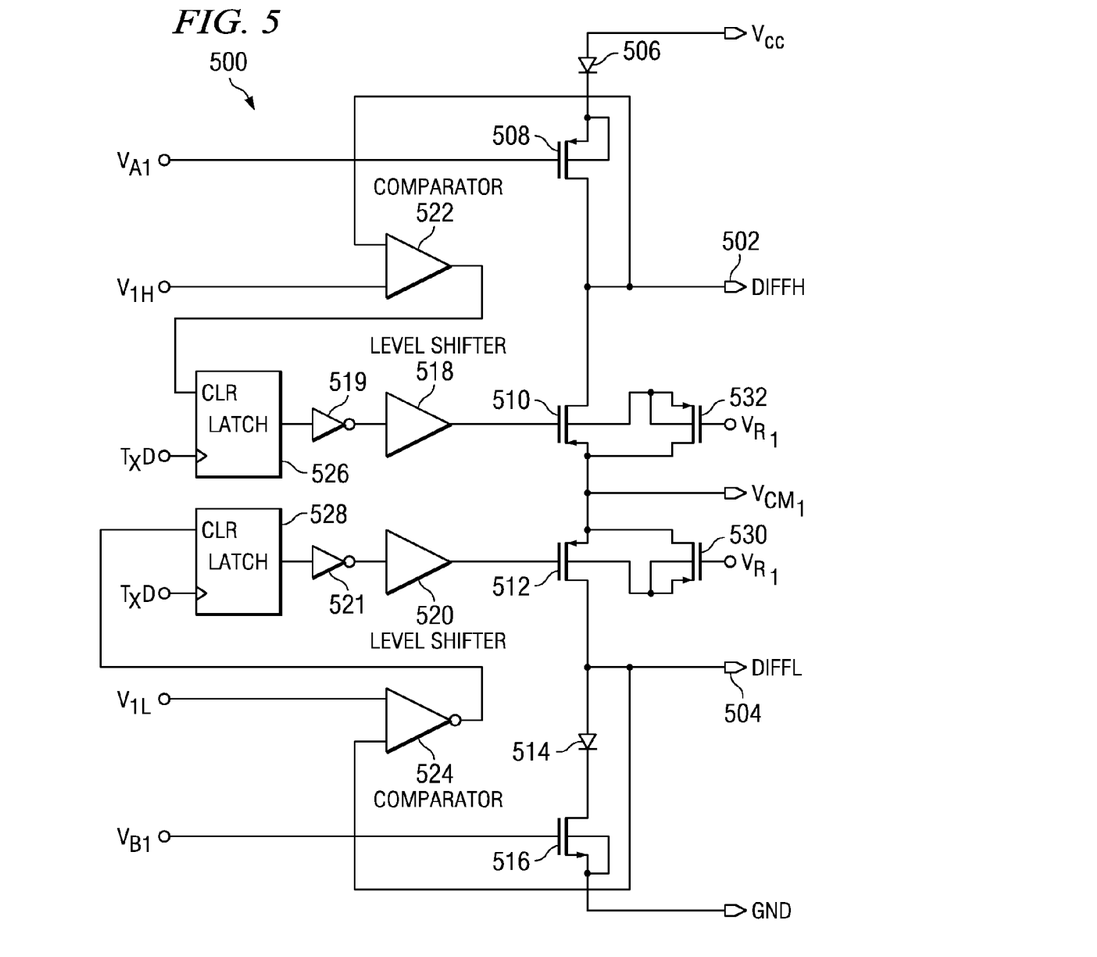
FIG. 5 illustrates a single-stage differential bus network driver in accordance with the present invention.

Referring to FIG. 5, a schematic diagram of a driver circuit of a differential bus network in accordance with the present invention is displayed. In this embodiment, driver output signals DIFF-H and DIFF-L, coupled at terminals 502 and 504, respectively, are driven symmetrically in opposite directions in response to an input signal $T_{xD}$, coupled to the clocking input of latches, 526 and 525.

The DIFF-H driver circuitry includes PMOS field effect transistor (FET) 510, having its source coupled to common-mode voltage reference terminal $V_{CM1}$. A second PMOS FET 532 couples across FET 510, wherein the backgate and source of FET 532 connect to the backgate of FET 510 and the drain of FET 532 connects to the source of FET 510. The gate of FET 532 receives a first voltage reference $V_{R1}$. The drain of FET 510 connects to the drain of a third PMOS FET 508 to form the high-side differential output terminal 502. The backgate and source of FET 508 connect to a diode 506 that connects to the first power supply rail $V_{CC}$. The gate of FET 508 receives a second voltage reference $V_{A1}$. A comparator 522 connects to receive a high-side common-mode voltage $V_{1H}$ and the high-side differential output signal DIFF-H, wherein the high-side common-mode voltage $V_{1H}$ is equivalent to the common-mode voltage reference terminal $V_{CM1}$ plus 0.5V. The output of comparator 522 connects to the clear input of latch 526. A level shifter 518 connects between the output of latch 526 and the gate of FET 510.

The DIFF-L driver circuitry includes fourth PMOS field effect transistor (FET) 512, having its source coupled to common-mode voltage reference terminal $V_{CM1}$. A fifth PMOS FET 530 couples across FET 512, wherein the backgate and source of FET 530 connect to the backgate of FET 512 and the drain of FET 530 connects to the source of FET 512. The gate of FET 530 receives a first voltage reference $V_{R1}$. The drain of FET 510 connects to a diode 514 to form the low-side differential output terminal 504. Diode 514 connects to the drain of a first NMOS FET 516. The backgate and source of FET 516 connect to the second power supply rail Gnd. The gate of FET 516 receives a third voltage reference $V_{B1}$. A comparator 524 connects to receive a low-side common-mode voltage $V_{1L}$ and the low-side differential output signal DIFF-L, wherein the high-side common-mode voltage $V_{1L}$ is equivalent to the common-mode voltage reference terminal $V_{CM1}$ minus 0.5V. The output of comparator 524 connects to the clear input of latch 528. A level shifter 520 connects between the output of latch 528 and the gate of FET 512.

In operation, a differential network driver and its associated protection circuitry, isolates low voltage devices from the effects of over-voltage transients on nodes 502 and 504. Specifically, transistors 508 and 516 function as drivers, while transistors, 510 and 512, maintain control from the dominant to the recessive transition. When transistors, 508 and 516, turn off, transistors, 510 and 512, turn on and short bus nodes, 502 and 504, to some predetermined reference value. These reference values are established by the common-mode voltage reference signal $Vcm_i$. As shown, the source of transistors, 510 and 512, are held at the common-mode voltage reference signal $V_{croi}$. During the dominant state of the output driver, transistors, 510 and 512, are off, while transistors, 508 and 516 are on. During the dominant to recessive state transition, transistors, 508 and 516, turn off. Once transistors, 508 and 516, turn off, transistors, 510 and 512, turn on. Accordingly, bus signals, $DIFF_H$ and $DIFF_L$, are shorted to the common-mode voltage reference signal Vail. The pair of latches, 526 and 528, and pair of level shifters, 518 and 520, are incorporated in the design for the purpose of shutting off transistors, 510 and 512, after the bus signals are at a valid common mode voltage.

In particular, comparators, 522 and 524, detect the bus signals, $DIFF_H$ and $DIFF_L$, and provide a signal to latches, 526 and 528, to turn on and off transistors, 510 and 512, such that the bus nodes, 502 and 504, are maintained at some common mode voltage, preferably at voltage $V_{CM1}$. It is not desirable, however, to drive the bus during a recessive state. Thus, transistors, 510 and 512, must be shut off when the bus signals are at a valid common mode voltage. Accordingly, transistors, 510 and 512, only stay on for a short period of time. Thus, the primary purpose for latches, 526 and 528, is to turn transistors, 510 and 512, on and off, after the comparators, 522 and 524, detect that the bus signals are at a valid common mode voltage.

Diodes, 506 and 514, are used to protect the driver 500 from voltage transients in the power supply rails, $V_{CC}$ and $G_{ND}$. Specifically, when bus signal $DIFF_L$ goes to some negative voltage, diode 514 protects the driver 500. Diode 514 blocks current from the ground $G_{ND}$ to the node 504 where the low-side differential network bus signal $DIFF_L$ enters. When bus signal $DIFF_H$ goes to some very high positive voltage, diode 506 is used to protect driver 500. Diode 506 blocks current from node 502 going into the supply rail $V_{CC}$. Thereby, Schottky diodes, 506 and 514, dominate the impedance of the paths between the two differential bus network wires and the voltage references. In this way, the impedance contributions of transistors 508, 510, 512, and 516 are minimized. The dominant effect of diodes, 506 and 514, enhance the capability of matching for symmetry between $DIFF_H$ and $DIFF_L$. Those skilled in the art would recognize that for other embodiments of bus differential networks, diodes 514 and 506 are not critical elements.

Effectively, as mentioned previously, this differential network driver and its associated protection circuitry, isolates low voltage devices from the effects of over-voltage transients on nodes 502 and 504. When a high voltage, typically in excess of 9 volts, is sensed on node 502, comparator 522 disconnects the gate of $DIFF_H$ driver transistor 510 from the circuit latch 526, and level shifter 518. This technique protects the sensitive gate oxide of the low voltage $DIFF_H$ driver transistor 510. In addition, the high voltage transient current to power supply voltage $V_{CC}$ is blocked by the high voltage Schottky diode 506.

Similarly, when a high voltage, typically in excess of 9 volts, is sensed on node 504, comparator 524 disconnects the gate of $DIFF_L$ driver transistor 512 from the circuit through latch 528, inverter 521 and level shifter 520 as well as disconnecting the source ground connection through transistor 516. Again, it is seen that the gate of transistor 512 is allowed to float to the $DIFF_L$ potential to protect the sensitive gate oxide of the low voltage $DIFF_L$ driver transistor 512. Since the low-side driver transistor 512 is effectively isolated and biased to power supply voltage Vcc through an integrated Schottky diode (not shown), the high voltage transient current to power supply voltage Vcc is effectively blocked thereby.

Figure 6:
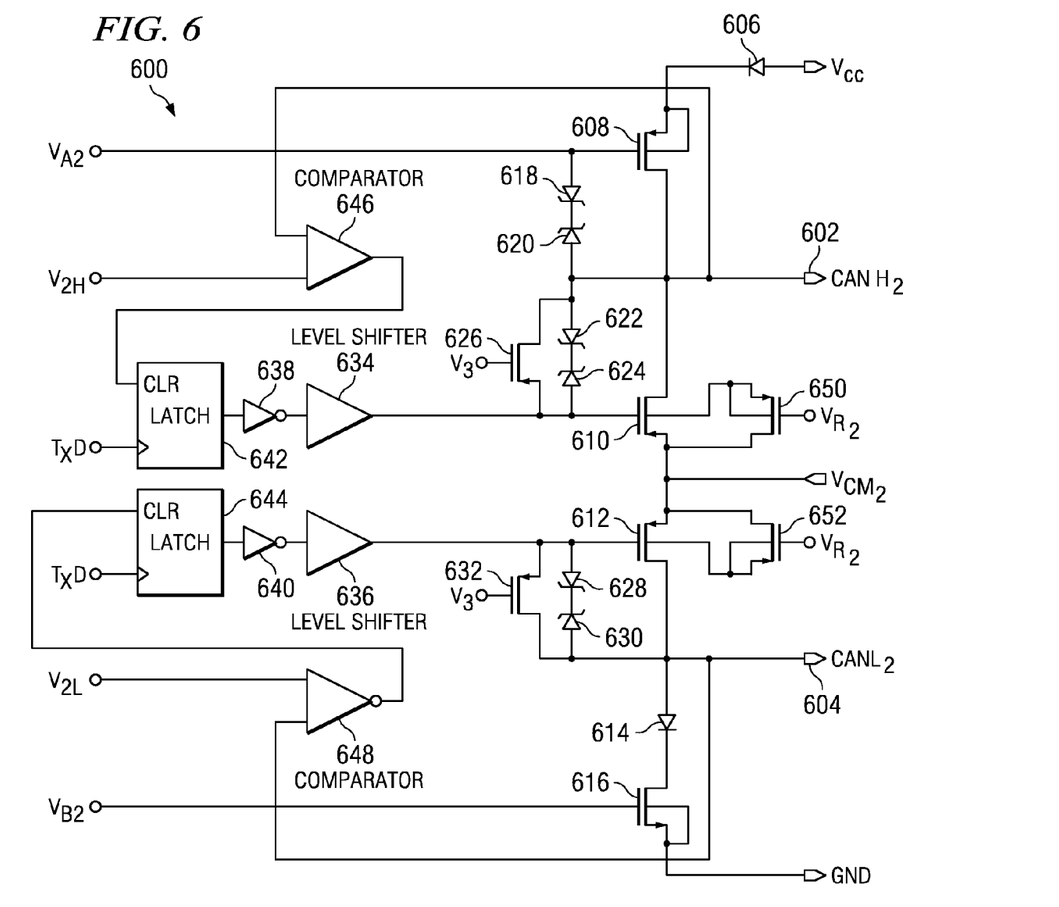
FIG. 6 illustrates a single-stage CAN driver in accordance with the present invention.

A schematic diagram of a driver circuit of a CAN network in accordance with the present invention is illustrated in FIG. 6. In this embodiment, driver output signals, $CANH_2$ and $CANL_2$, coupled at terminals 602 and 604, respectively, are driven symmetrically in opposite directions in response to an input signal $V_{A2}$ and $V_{B2}$.

Referring to FIG. 6, the CAN-H driver circuitry includes PMOS field effect transistor (FET) 610, having its source coupled to common-mode voltage reference terminal $V_{CM2}$. A second PMOS FET 650 couples across FET 610, wherein the backgate and source of FET 650 connect to the backgate of FET 610 and the drain of FET 650 connects to the source of FET 610. The gate of FET 650 receives a first voltage reference $V_{R2}$. Diodes 622 and 624 are coupled in a back-to-back configuration between the gate and drain of FET 610. The drain of FET 610 connects to the drain of a third PMOS FET 608 to form the high-side CAN output terminal 602. The backgate and source of FET 608 connect to a diode 606 that connects to the first power supply rail $V_{CC}$. Diodes 618 and 620 are coupled in a back-to-back configuration between the gate and drain of FET 608. The gate of FET 608 receives a second voltage reference $V_{A2}$. A fourth PMOS FET 626 couples across diodes 622 and 624, wherein the source of FET 626 connects to the gate of FET 610 and the drain of FET 626 connects to the drain of FET 610. A comparator 646 connects to receive a high side common-mode voltage $V_{2H}$ and the high-side CAN output signal $CANH_2$, wherein the high-side common-mode voltage $V_{2H}$ is equivalent to the common-mode voltage reference terminal $V_{CM2}$ plus 0.5V. The output of comparator 646 connects to the clear input of latch 642. An inverter 638 connects between the output of latch 642 and a level shifter 634, which connects to the gate of FET 610.

The low-side CAN driver circuitry includes fifth PMOS field effect transistor (FET) 612, having its source coupled to common-mode voltage reference terminal $V_{CM2}$. A sixth PMOS FET 652 couples across FET 612, wherein the backgate and source of FET 652 connect to the backgate of FET 612 and the drain of FET 652 connects to the source of FET 612. The gate of FET 652 receives a first voltage reference $V_{R2}$. Diodes, 628 and 630, are coupled in a back-to-back configuration between the gate and drain of FET 612. The drain of FET 612 connects to diode 614 to form the low-side CAN output terminal 604. Diode 614 connects to the drain of a first NMOS FET 616. The backgate and source of FET 616 connect to the second power supply rail Gnd. The gate of FET 616 receives a third voltage reference $V_{B2}$. A seventh PMOS FET 632 couples across diodes, 628 and 630, wherein the source of FET 632 connects to the gate of FET 612 and the drain of FET 632 connects to the drain of FET 612. A comparator 648 connects to receive a low-side common-mode voltage $V_{2L}$ and the low-side CAN output signal $CANL_2$, wherein the high-side common-mode voltage $V_{2L}$ is equivalent to the common-mode voltage reference terminal $V_{CM2}$ minus 0.5V. The output of comparator 648 connects to the clear input of latch 644. An inverter 640 connects between the output of latch 644 and a level shifter 636, which connects to the gate of FET 612.

In operation, similar to the operation of the driver of FIG. 5, transistors 608 and 616 function as drivers, while transistors, 610 and 612, maintain control from the dominant to the recessive transition. When transistors, 608 and 616, turn off, transistors, 610 and 612, turn on and short bus signals, $CANH_2$ and $CANL_2$, to some predetermined reference values. These reference values are established by the common-mode voltage reference signal $V_{CM2}$. In a CAN voltage reference analysis, the voltage of the common-mode voltage reference signal $V_{CM2}$ is generally equal to 2.5 v. As shown, the source of transistors, 610 and 612, are held at the common-mode voltage reference signal $V_{CM2}$. During the dominant state, transistors, 610 and 612, are off, while transistors, 610 and 616 are on. During the dominant to recessive state transition, transistors, 610 and 616, turn off. Once transistors, 610 and 616, turn off, transistors, 610 and 612, turn on. Accordingly, bus signals, $CANH_2$ and $CANL_2$, are shorted to the common-mode voltage reference signal $V_{CM2}$. The pair of latches, 642 and 644, and pair of level shifters, 634 and 636, for the purpose of shutting off transistors, 610 and 612, after the bus signals are at a valid common mode voltage. Accordingly, transistors, 610 and 612, turn on and short bus signals, $CANH_2$ and $CANL_2$, to the common-mode voltage reference signal $V_{CM2}$. It is not desirable, however, to drive the bus during a recessive state. Thus, transistors, 610 and 612, must be shut off when the bus signals are at a valid common mode voltage. Herein, the latches, 642 and 644, and level shifters, 634 and 636, provide the gate signals for transistors, 610 and 612, where the objective is not to drive the bus during the recessive state.

Specifically, comparators, 646 and 648, detect the bus signal and provide a signal to latches, 642 and 644, to turn off transistors, 610 and 612 such that the bus is maintained at some common mode voltage, preferably at voltage $V_{CM2}$. In operation, transistors, 610 and 612, only remain on for a short period of time. In this particular design, transistors, 610 and 612, remain on for only tens of nano seconds. Thus, the primary purpose for latches, 642 and 644, is to turn transistors, 610 and 612, on and off, once the comparators, 646 and 648, detect that the bus signals are at a valid common mode voltage.

With reference to the low-side CAN driver, the signal latched in latch 644 is sent to level shifter 636 to be level shifted, for example, from 3 to 5 volts. The output of level shifter 636 is coupled to the gate of transistor 612. When the signal out of level shifter 636 is low, transistor 612 will turn on and current will flow from common mode voltage $V_{CM2}$ through transistor 612. When the signal out of level shifter 636 is high, transistor 612 turns off and isolates bus signal $CANL_2$ from the signal at the common-mode node $V_{CM2}$. Some of the circuitry that exists from the gate to the drain of FET 612 is diode clamped by diodes, 628 and 630. These diodes serve to protect the breakdown voltage from the gate to drain of FET 612. Thus, for instance, if the bus signal $CANL_2$ transitions high, at some point, diode 630 will forward bias and diode 628 will reverse bias. Accordingly, the gate of transistor 612 will come up with the voltage at node 604. Thus, there will always be a reverse bias diode and a forward bias diode connected to node 604, which protects the gate to drain breakdown of FET 612. Accordingly, the MOS input capacitances of transistors, 610 and 612, can be made to match, providing the best timing match to the gates of these components.

Diodes, 606 and 614, are used to protect the driver 600 from voltage transients in the power supply rails, $V_{CC}$ and $G_{ND}$. Specifically, when bus signal $CANL_2$ goes to some negative voltage, diode 614 protects the driver 600. Diode 614 blocks current from the ground $G_{ND}$ or supply rail $V_{CC}$ to the node 604 where the low-side CAN bus signal $CANL_2$ enters. When bus signal $CANH_2$ goes to some very high positive voltage, diode 606 is used to protect driver 600. Diode 606 blocks current from node 602 going into the supply rail $V_{CC}$. Thereby, Schottky diodes, 606 and 614, dominate the impedance of the paths between the two CAN wires and the voltage references. In this way, the impedance contributions of transistors 608, 610, 612, and 616 are minimized. The dominant effect of diodes, 606 and 614, enhance the capability of matching for symmetry between $CANH_2$ and $CANL_2$. Those skilled in the art would recognize that for other embodiments of bus differential networks, diodes 614 and 606 are not critical elements.

Effectively, the above-described circuit, this CAN driver and its associated protection circuitry, isolates low voltage devices from the effects of over-voltage transients on the $CANH_2$ and $CANL_2$ wires. When a high voltage, typically in excess of 9 volts, is sensed on the $CANH_2$ line, comparator 646 disconnects the gate of $CANH_2$ driver transistor 610 from the circuit latch 642, inverter 638, and level shifter 634, allowing the gate of transistor 610 to float to the CAN bus signal $CANH_2$ potential through Zener diodes 622 and 624. This technique protects the sensitive gate oxide of the low voltage $CANH_2$ driver transistor 610. In addition, the high voltage transient current to power supply voltage Vcc is blocked by the high voltage Schottky diode 606.

Similarly, when a high voltage, typically in excess of 9 volts, is sensed on the $CANL_2$ line, comparator 648 disconnects the gate of $CANL_2$ driver transistor 612 from the circuit through latch 644, inverter 640 and level shifter 636 as well as disconnecting the source ground connection through transistor 616. Again, it is seen that the gate of transistor 612 is allowed to float to the $CANL_2$ potential through Zener diodes 628 and 630 to protect the sensitive gate oxide of the low voltage $CANL_2$ driver transistor 612. Since the low-side driver transistor 612 is effectively isolated and biased to power supply voltage Vcc through an integrated Schottky diode (not shown), the high voltage transient current to power supply voltage Vcc is effectively blocked thereby.

When a low voltage, which may be as low as −5 volts, is coupled onto the node 602, protection is provided by PMOS transistor 608, which will be off and typically has a breakdown voltage of 6.5 volts. Similarly, protection from a low voltage, which may be as low as −5 volts, coupled onto node 604, is provided by diode 614, which may have a reverse breakdown voltage of 40 volts.

Normally, the bus signals, $CANH_2$ and $CANL_2$, are 5 v but they can reach levels of 40 v which poses a lot of challenges for transistors, 610 and 612. Thereby, since CAN bus signals, $CANH_2$ and $CANL_2$, can be high voltage signals, diodes 622, 624, 628, 630, and transistors, 626 and 632, all exist to protect transistors, 610 and 612. These elements are implemented to represent some type of control circuitry for transistors, 610 and 612.

Figure 7:
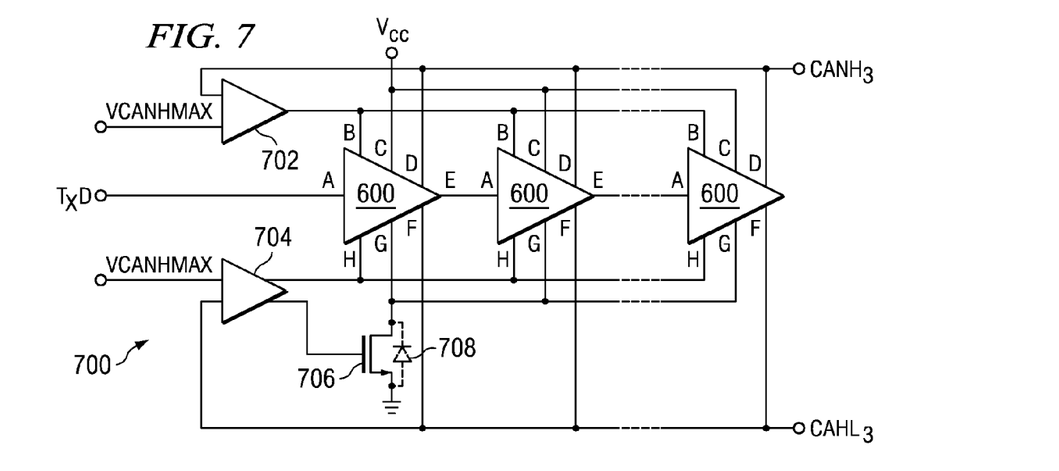
FIG. 7 illustrates a multi-stage CAN driver system in accordance with the present invention.

A plurality of the circuits shown in FIGS. 5 and 6 may be concatenated to enhance signal symmetry and shape the waveforms during switching. FIG. 7 illustrates a multi-stage CAN driver in accordance with the present invention. A plurality of CAN drivers 600 are serially interconnected to form a driver system, wherein each downstream driver stage receives a time-delayed form of the digital input signal, $T_{xD}$, each stage providing a time-delayed contribution to the differential output signals, $CANH_3$ and $CANL_3$, of the overall driver system. The multi-stage driver system comprises a serial connection of a number of individual CAN drivers 600, the number of such drivers being eight, by way of illustration. Each driver 600 may be identical to the driver of FIG. 6, excepting that comparators, 702 and 704, and transistor 706 are common to the entire plurality.

Figure 8:
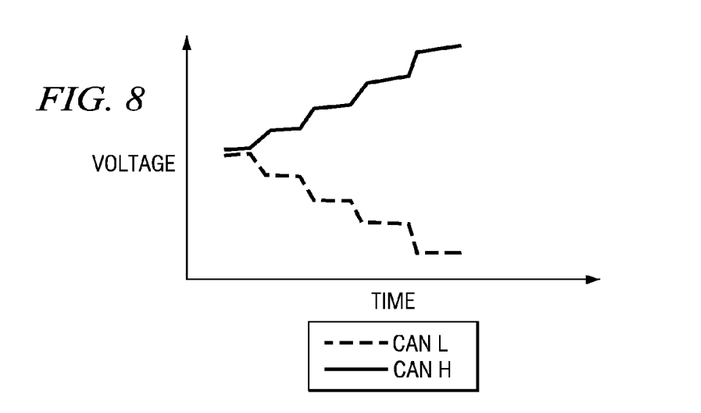
FIG. 8 illustrates a pair of waveforms demonstrating the actual performance of the driver of FIG. 7.

Each cell 600 turns on one after another similar to a domino effect. Thus, you have each cell turning on through the first eight stages and then each cell turns off one after another through the eight stages. The cells are duplicated because the output as shown in FIG. 8 is sort of like a step function going from the recessive to dominant state. The purpose of the small steps is to control the slope. If you turn the transistors all the way on and all the way off, there will be spikes in the output, which cause radiated emissions. It is desirous to have nice smooth signals in an effort to control radiated emissions. The objective of each of these stages is to create a nice smooth slope.

While the principles of the present invention have been demonstrated with particular regard to the structures and methods disclosed herein, it will be recognized that various departures may be undertaken in the practice of the invention. The scope of the invention is not intended to be limited to the particular structures and methods disclosed herein, but should instead be gauged by the breadth of the claims that follow.

Those of skill in the art will recognize that the physical location of the elements illustrated in FIGS. 5 and 6 can be moved or relocated while retaining the function described above.

The advantages include but are not to a differential bus network output driver that minimizes common-mode disturbance during bus transitions, but also a differential bus network that provides improved symmetry between its differential output signals and provides protection for its low voltage devices from voltage transients occurring on its output lines.

Since previous driver designs did not attempt to sense or control the common-mode signal, these designs are inhibited by variations due to process system conditions, high frequency injection, etc. In contrast, the differential bus network driver in accordance with the present invention is not inhibited by variations due to process system conditions, high frequency injection, etc.

The reader's attention is directed to all papers and documents which are filed concurrently with this specification and which are open to public inspection with this specification, and the contents of all such papers and documents are incorporated herein by reference.

All the features disclosed in this specification (including any accompany claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. A differential bus network output driver for supplying a high-side differential output signal and a low-side differential output signal through a high-side differential output terminal and a low-side differential output terminal to a two-wire link in response to an input signal, the differential bus network having a first and a second power supply rail, comprising:

a high-side driver that comprises,
a first p-channel transistor, having a source, a gate, a backgate, and a drain,
a second p-channel transistor, having a source, a gate, a backgate, and a drain, the backgate coupled to the source, the source coupled to the backgate of the first p-channel transistor, the drain coupled to the source of the first p-channel transistor, the gate coupled to receive a first voltage reference, a third p-channel transistor, having a source, a gate, a backgate, and a drain, the backgate coupled to the source, the drain coupled to the drain of the first p-channel transistor to form the high side differential output terminal, the gate coupled to receive a second voltage reference, a first diode coupled between the first power supply rail and the source of the third p-channel transistor, a first comparator, having a first input, a second input, and an output, the first and second inputs of the first comparator being coupled to receive the high-side differential output signal and a high-side voltage reference, respectively, a first latch, having a clear input, a clock input, and an output, the clear input coupled to the output of the first comparator, the clock input coupled to receive-the input signal, and a first level-shifter coupled between the output of the first latch and the gate of the first p-channel transistor; and a low-side driver that comprises, a fourth p-channel transistor, having a source, a gate, a backgate, and a drain, the source coupled to the source of the first p-channel transistor to form a common-mode voltage reference node to receive a common-mode voltage reference, a fifth p-channel transistor, having a source, a gate, a backgate, and a drain, the source coupled to the backgate and the backgate of the fourth p-channel transistor, the drain coupled to the source of the fourth p-channel transistor, the gate coupled to receive a third voltage reference, a second diode coupled to the drain of the fourth p-channel transistor to form the low-side differential output terminal, a first n-channel transistor, having a source, a gate, a backgate, and a drain, the drain coupled to the second diode, the backgate coupled to the source, the source coupled the second power supply rail, the gate coupled to receive a fourth voltage reference, a second comparator, having a first input, a second input, and an output, the first and second inputs of the second comparator being coupled to receive the low-side differential output signal and a low-side voltage reference, respectively, a second latch, having a clear input, a clock input, and an output, the clear input coupled to the output of the second comparator, the clock input coupled to receive the input signal, and a second level-shifter coupled between the output of the second latch and the gate of the fourth p-channel transistor.

2. The differential bus network output driver of claim 1 further comprising:

a third diode and a fourth diode coupled in series back-to-back between the high-side differential output terminal and the gate of the third p-channel transistor.

3. The differential bus network output driver of claim 2, wherein the third and fourth 2 diodes are Zener diodes.

4. The differential bus network output driver of claim 1 further comprising:

a third diode and a fourth diode coupled in series back-to-back between the drain and the gate of the first p-channel transistor.

5. The differential bus network output driver of claim 4, wherein said third and fourth diodes are Zener diodes.

6. The differential bus network output driver of claim 1, wherein the first and second diodes are Schottky diodes.

7. A controller area network output driver for supplying a high-side controller area network output signal and a low-side controller area network output signal through a high-side controller area network output terminal and a low-side controller area network output terminal to a two-wire link in response to an input signal, the controller area network having a first and a second power supply rail, comprising:

a high-side driver that comprises, a first p-channel transistor, having a source, a gate, a backgate, and a drain, a second p-channel transistor, having a source, a gate, a backgate, and a drain, the backgate coupled to the source, the source coupled to the backgate of the first p-channel transistor, the drain coupled to the source of the first p-channel transistor, a third p-channel transistor, having a source, a gate, a backgate, and a drain, the backgate coupled to the source, the drain coupled to the drain of the first p-channel transistor to form the high side controller area network output terminal, the gate coupled to receive a first voltage reference, a first diode and a second diode coupled in series back-to-back between the drain and the gate of the third p-channel transistor, a fourth p-channel transistor, having a source, a gate, and a drain, the drain coupled to the drain of the first p-channel transistor, the source coupled to the gate of the first p-channel transistor, the gate coupled to receive a second voltage reference, a third diode and a fourth diode coupled in series back-to-back between the drain and the gate of the first p-channel transistor, a fifth diode coupled between the first power supply rail and the source of the third p-channel transistor, a first comparator, having a first input, a second input, and an output, the first input coupled to receive the high-side controller area network output signal from the high-side controller area network output terminal, the second input coupled to receive a third voltage reference, a first latch, having a clear input, a clock input, and an output, the clear input coupled to the output of the first comparator, the clock input coupled to receive a the input signal, a first inverter coupled to the output of the first latch, and a first level-shifter coupled between the first inverter and the gate of the first p- channel transistor; and a low-side driver that comprises, a fifth p-channel transistor, having a source, a gate, a backgate, and a drain, the source coupled to the source of the first p-channel transistor to form a common-mode voltage reference node to receive a common-mode voltage reference, a sixth p-channel transistor, having a source, a gate, a backgate, and a drain, the source coupled to the backgate and the backgate of the fifth p-channel transistor, the drain coupled to the source of the fifth p-channel transistor, the gate of the sixth transistor and the gate of the second p-channel transistor both coupled to receive the first voltage reference, a sixth diode coupled to the drain of the fourth p-channel transistor to form the low-side controller area network output terminal, a first n-channel transistor, having a source, a gate, a backgate, and a drain, the drain coupled to the second diode, the backgate coupled to the source, the source coupled the second power supply rail, the gate coupled to receive a fourth voltage reference, a seventh diode and a eight diode coupled in series back-to back between the drain and the gate of the fourth p-channel transistor, a seventh p-channel transistor, having a source, a gate, and a drain, the drain coupled to the drain of the fifth p-channel transistor, the source coupled to the gate of the fifth p-channel transistor, the gate coupled to receive the second voltage reference, a second comparator, having a first input, a second input, and an output, the first and second inputs to the second comparator being coupled to receive the low-side controller area network output signal from the low-side controller area network output terminal and a fifth voltage reference, respectively, a second latch, having a clear input, a clock input, and an output, the clear input coupled to the output of the second comparator, the clock input coupled to receive the input signal, a second inverter coupled to the output of the second latch, and a second level-shifter coupled between the second inverter and the gate of the fourth p-channel transistor.

8. The controller area network output driver of claim 7, wherein the first and second diodes are Zener diodes.

9. The controller area network output driver of claim 7, wherein the third and fourth diodes are Zener diodes.

10. The controller area network output driver of claim 7, wherein the fifth diode is a Schottky diode.

11. The controller area network output driver of claim 7, wherein the sixth diode is a Schottky diode.

12. The controller area network output driver of claim 7, wherein the seventh and eight diodes are Zener diodes.

13. A differential bus network output driver for supplying a high-side differential output signal and a low-side differential output signal through a high-side differential output terminal and a low-side differential output terminal, respectively, to a two-wire link in response to a differential input signal, comprising:

a high-side driver circuit for providing the high-side output signal;

a lowside driver circuit for providing the low-side output signal;

a common mode reference signal source supplying a common mode voltage for the differential input signal;

a switching circuit coupling the high-side driver circuit and low-side driver circuit to the common mode reference signal source during a transition from a dominant state where the high-side and low-side output signals have a differential voltage to a recessive state where the high-side and low-side output signals are at the same common mode voltage the switching circuit coupling the high-side driver circuit and the low-side driver circuit to the common mode reference signal only until the high-side output signal and the low-side output signal reach a valid common mode voltage, wherein the outputs are not driving the link during the recessive state.

14. The differential bus network output driver of claim 13 wherein the switching circuit comprises switching transistors that turn on when the high-side and low-side output drivers turn off.

15. The differential bus network output driver of claim 13 wherein the switching transistors are each controlled by a comparator coupled to the high-side output signal and low-side output signal, respectively and to a respective reference voltage.

16. The differential bus network output driver of claim 15 wherein each comparator is coupled to the switching transistor by a latch having a level shifted output.

17. The differential bus network output driver of claim 13 wherein the network is a controller area network (CAN).

18. The differential bus network output driver of claim 14 wherein the network is a controller area network (CAN).

19. The differential bus network output driver of claim 15 wherein the network is a controller area network (CAN).

* * * * *